June 20, 1939. A. J. BERGERON 2,163,186
POULTRY FEEDER
Filed Sept. 27, 1937 2 Sheets-Sheet 1
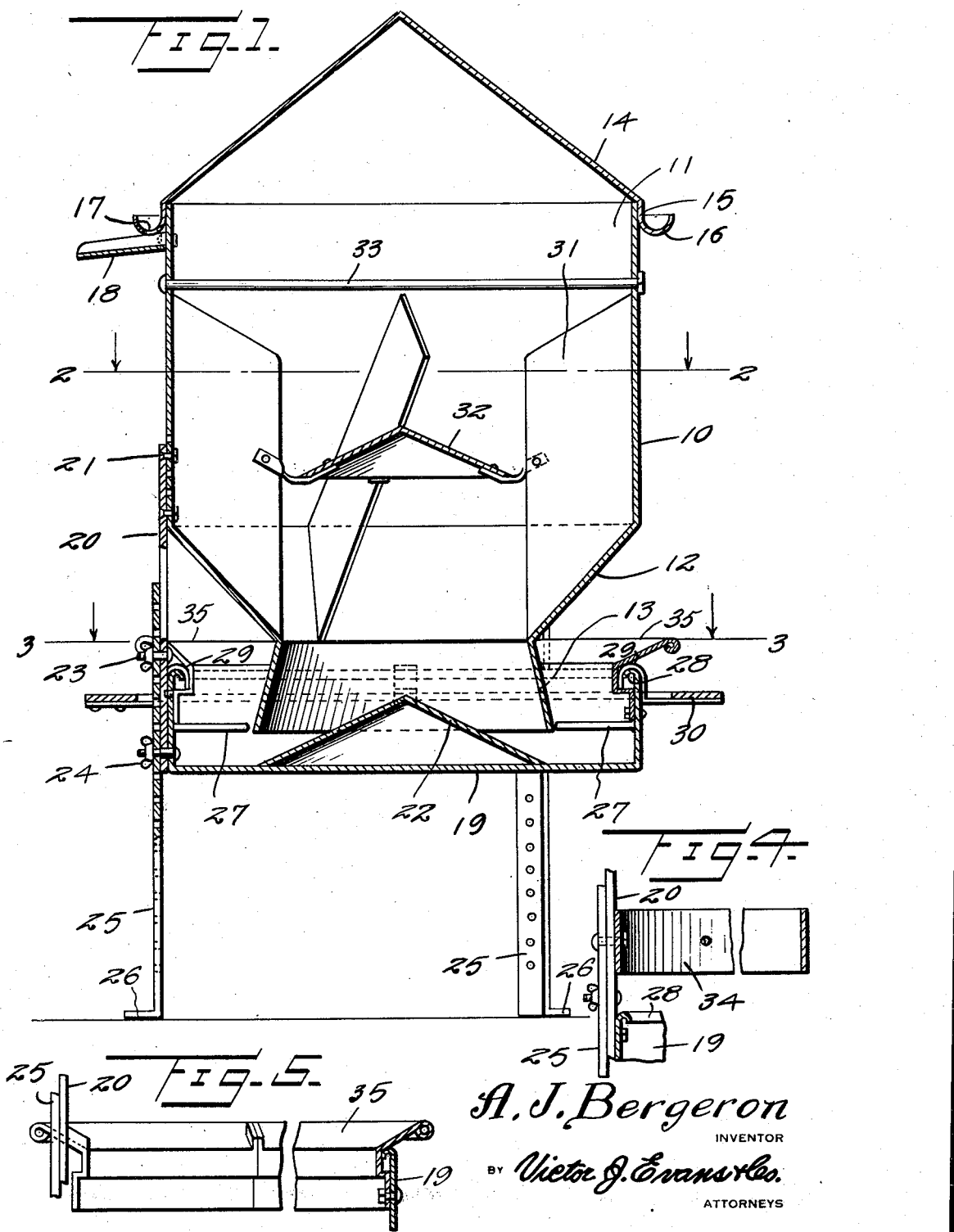

June 20, 1939. A. J. BERGERON 2,163,186
POULTRY FEEDER
Filed Sept. 27, 1937 2 Sheets-Sheet 2
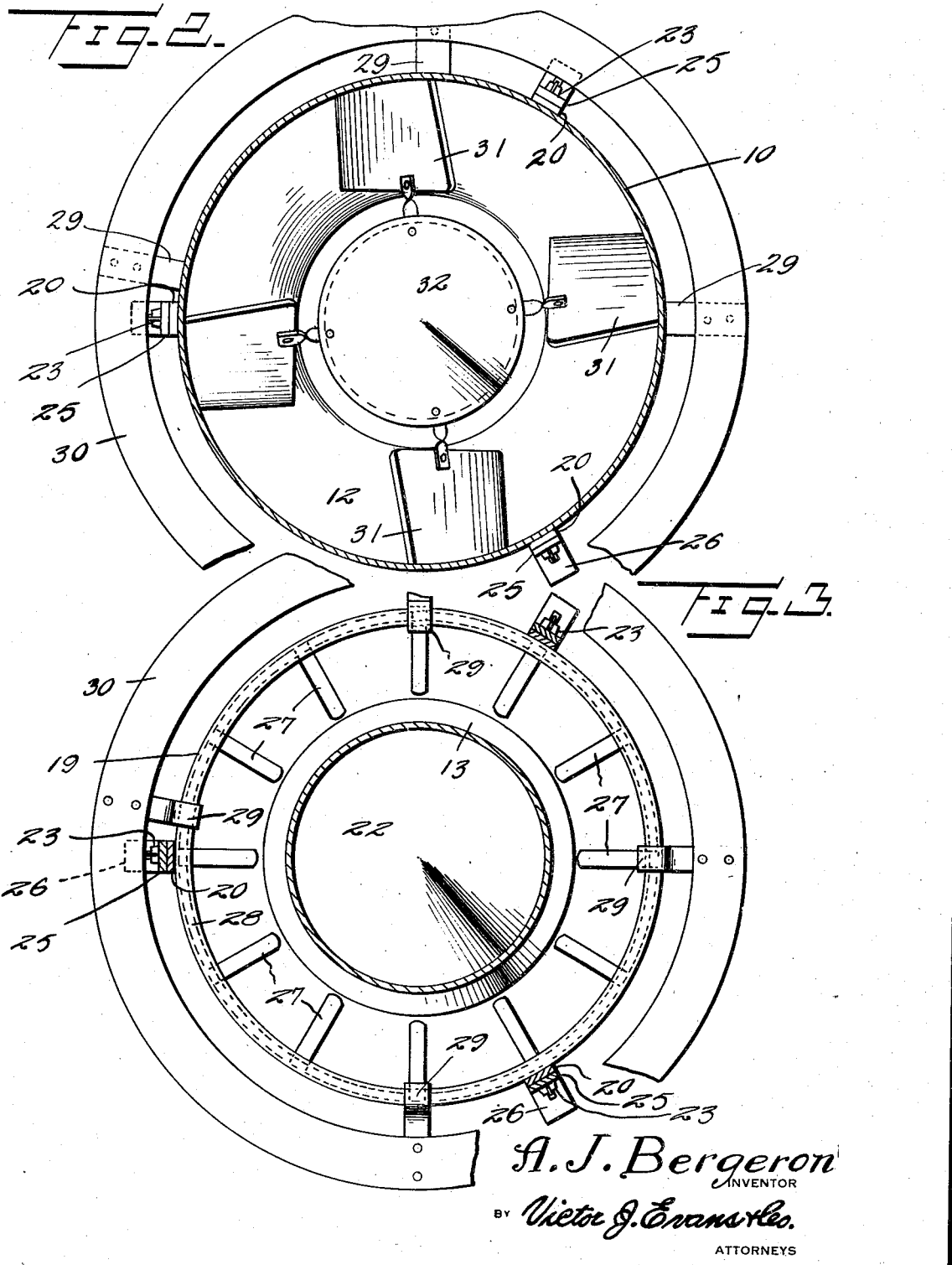

Patented June 20, 1939

2,163,186

UNITED STATES PATENT OFFICE 2,163,186

POULTRY FEEDER

Arthur J. Bergeron, Portsmouth, N. H.

Application September 27, 1937, Serial No. 165,999

3 Claims. (Cl. 119—53)

The invention relates to a feeder and more especially to poultry feeders.

The primary object of the invention is the provision of a feeder of this character, wherein the construction and assembly thereof enables the feeding of young or aged poultry, that is to say, day old chicks or matured hens, the feed, whether dry mash, hard grain, oyster shells, grit or charcoal, will be properly fed and the beaking out of the feed will be prevented and such feeder can be raised or lowered to render it a high or low feeder as the occasion may require.

Another object of the invention is the provision of a feeder of this character, wherein the same is usable indoors or outdoors, the poultry having access to the feeding pan and young chicks can not enter the pan for the scratching of the feed therein, being a year-around usable feeder with the feed maintained fresh and clean.

A further object of the invention is the provision of a feeder of this character, wherein the construction thereof is novel in its entirety and is thoroughly sanitary and susceptible of holding a large quantity of feed and eliminates waste thereof.

A still further object of the invention is the provision of a feeder of this character, which is simple in construction, thoroughly reliable and effective in operation, light in weight yet strong, durable, thoroughly sanitary and inexpensive to manufacture.

With these and other objects in view, the invention consists in the features of construction, combination and arrangement of parts as will be hereinafter more fully described, illustrated in the accompanying drawings, and pointed out in the claims hereunto appended.

In the accompanying drawings:

Figure 1 is a vertical longitudinal sectional view through a feeder constructed in accordance with the invention.

Figure 2 is a sectional view on the line 2—2 of Figure 1 looking in the direction of the arrows.

Figure 3 is a sectional view on the line 3—3 of Figure 1 looking in the direction of the arrows.

Figure 4 is a vertical sectional view through a guard ring for use with the feeder.

Figure 5 is a fragmentary vertical sectional view through a waste guard for use with the feeder.

Similar reference characters indicate corresponding parts throughout the several views in the drawings.

Referring to the drawings in detail, the poultry feeder comprises a cylindrical body 10 preferably made from sheet metal and constitutes a feed reservoir or compartment 11 having a contracted hopper-like lower end portion 12 terminating in a flared open end or mouth 13. The upper end of the body 10 is open and covering the same is a substantially conical shaped top or cap 14 having an annular rim 15 for telescopically fitting over the upper open end of the body 10. This rim is formed with an outwardly and upwardly curled annular water trough 16 provided at one point thereof with discharge apertures 17 for delivering water into a discharge spout 18 fixed below the trough 16 and exteriorly to the body 10. The cap 14 is adapted to shed water and the latter is troughed and finally discharged from the spout 18 when the feeder is used outdoors for poultry feeding purposes. Below the mouth 13 is positioned a feeding pan 19 which has bolted or otherwise secured at intervals concentrically thereto vertical supports 20, these through fasteners 21 have connected thereto the body 10 so that in this manner the said body and pan are held spaced from each other in a vertical direction.

The pan 19 interiorly thereof has a centered feed spreading cone 22 which is also centered with respect to the flared end or mouth 13 of the body 10 to spread the feed from the body 10 laterally in the pan 19 concentrically with respect to the said cone.

Engaged with the supports 20 and also with the pan 19 are winged nut-carrying bolts 23 and 24, respectively, for adjustable connection therewith of supporting legs 25 having the out-turned feet 26 so that in this manner the pan 19 can be raised and lowered relative to a foundation or ground surface, although the legs 25 can be dispensed with so that the pan 19 may sit directly onto a foundation or ground surface if desired.

Arranged interiorly of the pan 19 concentrically with respect to the cone 22 are radially disposed beak guards 27, these being effective for preventing the beaking out of the feed within the pan by poultry when feeding therefrom.

The pan 19 at its side wall has an inwardly and downwardly turned or curled upper edge 28, the pan being of circular contour and releasably engaged with this edge 28 are the hook-like hangers 29 of a chick step 30, which is concentrically disposed about the pan and slightly spaced therefrom so that chicks can stand upon the step during the feeding period in the use of the feeder.

Arranged interiorly of the body 10 within the compartment 11 are baffles or fins 31, these being angularly disposed to the vertical and are uniformly spaced from each other, projecting inwardly from the side wall of said body for a distance and the purpose of the fins is to slow the downward flow of feed within the compartment or reservoir 11 and to sustain a part of the weight thereof as well as assisting the avoidance of packing of mash, cracked grain or other feed, such as grits, charcoal, particularly when of powdered dry consistency. Associated with the fins 31 and centrally of the body 10 is a spreader cone 32 for the feed and this cone also assists in supporting the load of contents of the body 10. Above the fins 31 and disposed transversely interiorly of the body 10 is a bar 33 which functions as a brace and also as a handle when the cap 14 is removed from the body.

In Figure 4 of the drawings there is shown a guard ring 34, which is adapted to be disposed concentrically of the pan between the supports and the upper edge of said pan being usable for small chicks to prevent the latter from entering the pan 19 to avoid scratching of the feed therein, the use of the ring 34 being optional.

In Figure 5 of the drawings there is shown a sectional waste ring 35, which when associated with the pan is adapted for separable fastening thereto, eliminates waste of the feed resultant from beaking of the same by the poultry as the scattered feed falling upon the ring 35 when in use will drop back into the pan 19 the use of the ring 35 is also optional.

The hopper shaped lower end 12 of the body 10 with the flared end or mouth 13 in assembled relation to the pan 19 affords the proper clearance so that poultry can gain access to the pan for feeding purposes, the feed within the body 10 gravitating downwardly into the pan and being spread therein by the spreader cone 22.

There is no liability of the mash, the grain or other feeding material becoming clogged or packed within the feeder in the use thereof and such feeder by leg adjustment can be raised or lowered with respect to the ground or a foundation or on disuse of the legs 25 the pan 19 can rest directly upon the ground or foundation, it being preferable to elevate the feeder so as to prevent matured poultry from beaking out the feed from the pan 19 during the feeding period. The pan and the body of the feeder are susceptible of adjustment relative to each other and this is had in the use of the supports 20 and the fasteners 21, the latter being engageable in selected clearances therefor as provided in the body 10, the clearances being spaced from each other in a vertical direction while the fasteners are permanently held engaged in the supports 20.

What is claimed is:

1. A feeder of the kind described comprising a substantially cylindrical body of uniform cross sectional diameter for a major portion of its length and having a contracted downwardly tapered lower portion terminating in a flared open lower end, a plurality of baffles arranged within the said body, uniformly spaced from each other and projecting inwardly from the side wall of said body, the said baffles being angularly disposed to the vertical and extending for a distance within said body, a spreader cone within the body in confronting relation to the flared lower end between said baffles and having connection therewith, and a pan below the flared lower end of said body and spaced therefrom.

2. A feeder of the kind described comprising a substantially cylindrical body of uniform cross sectional diameter for a major portion of its length and having a contracted downwardly tapered lower portion terminating in a flared open lower end, a plurality of baffles arranged within the said body, uniformly spaced from each other and projecting inwardly from the side wall of said body, the said baffles being angularly disposed to the vertical and extending for a distance within said body, a spreader cone within the body in confronting relation to the flared lower end between said baffles and having connection therewith, a pan below the flared lower end of said body and spaced therefrom, and means adjustably connecting the body and pan together and constituting a support therefor.

3. A feeder of the kind described comprising a substantially cylindrical body of uniform cross sectional diameter for a major portion of its length and having a contracted downwardly tapered lower portion terminating in a flared open lower end, a plurality of baffles arranged within the said body, uniformly spaced from each other and projecting inwardly from the side wall of said body, the said baffles being angularly disposed to the vertical and extending for a distance within said body, a spreader cone within the body in confronting relation to the flared lower end between said baffles and having connection therewith, a pan below the flared lower end of said body and spaced therefrom, means adjustably connecting the body and pan together and constituting a support therefor, the side wall of the pan being in vertical alignment with the side wall of the body and terminating at its upper edge removed from the downwardly tapered portion of said body.

ARTHUR J. BERGERON.